July 26, 1966  H. A. BRISTOL  3,262,219
READING TRAINING APPARATUS
Filed Nov. 29, 1963  4 Sheets-Sheet 1
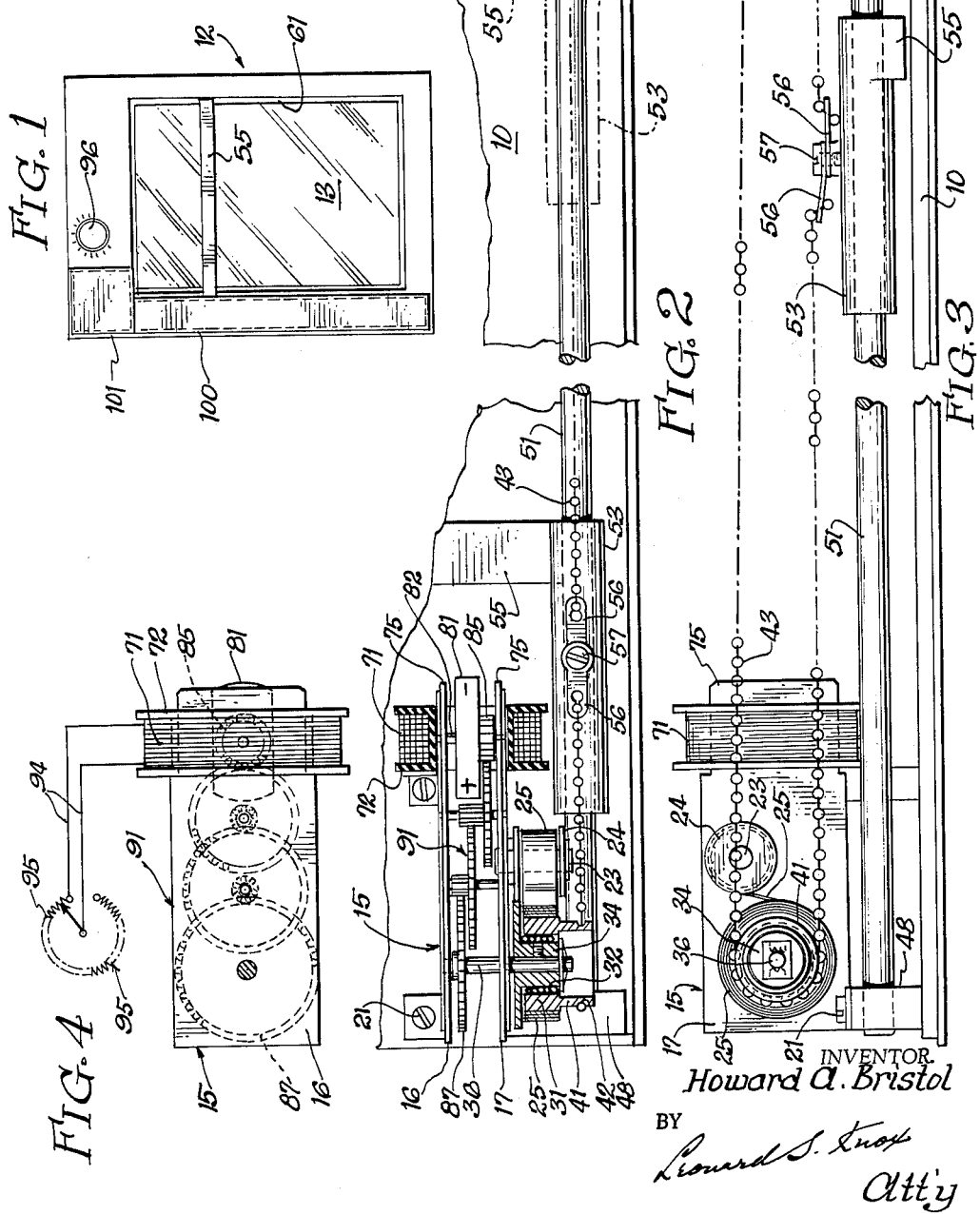
INVENTOR.
Howard A. Bristol
BY
Leonard S. Knox
Atty

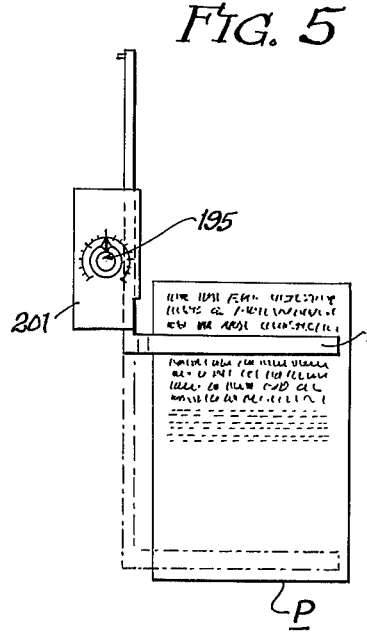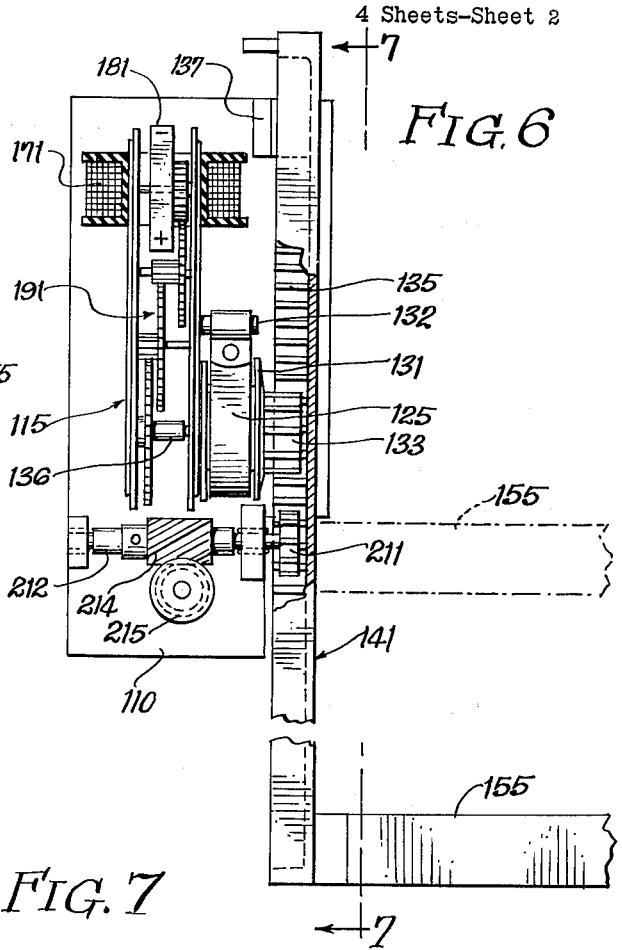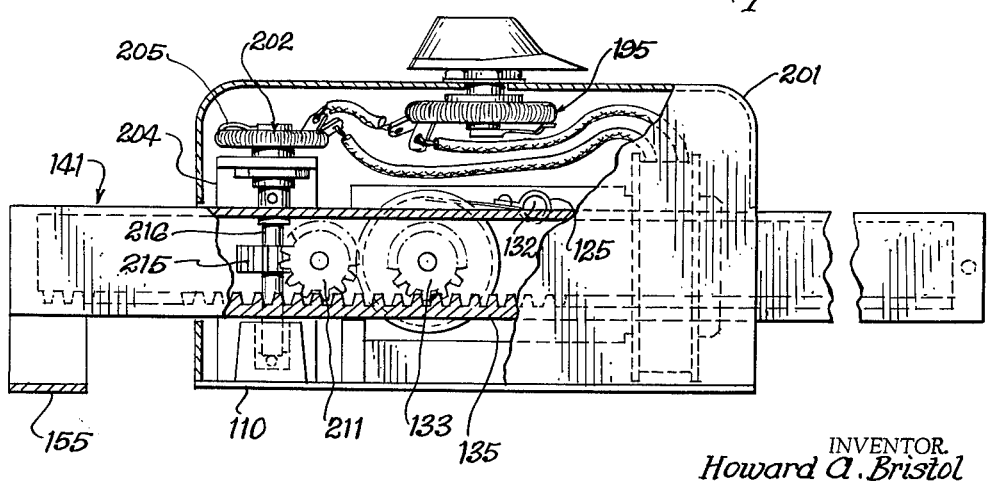

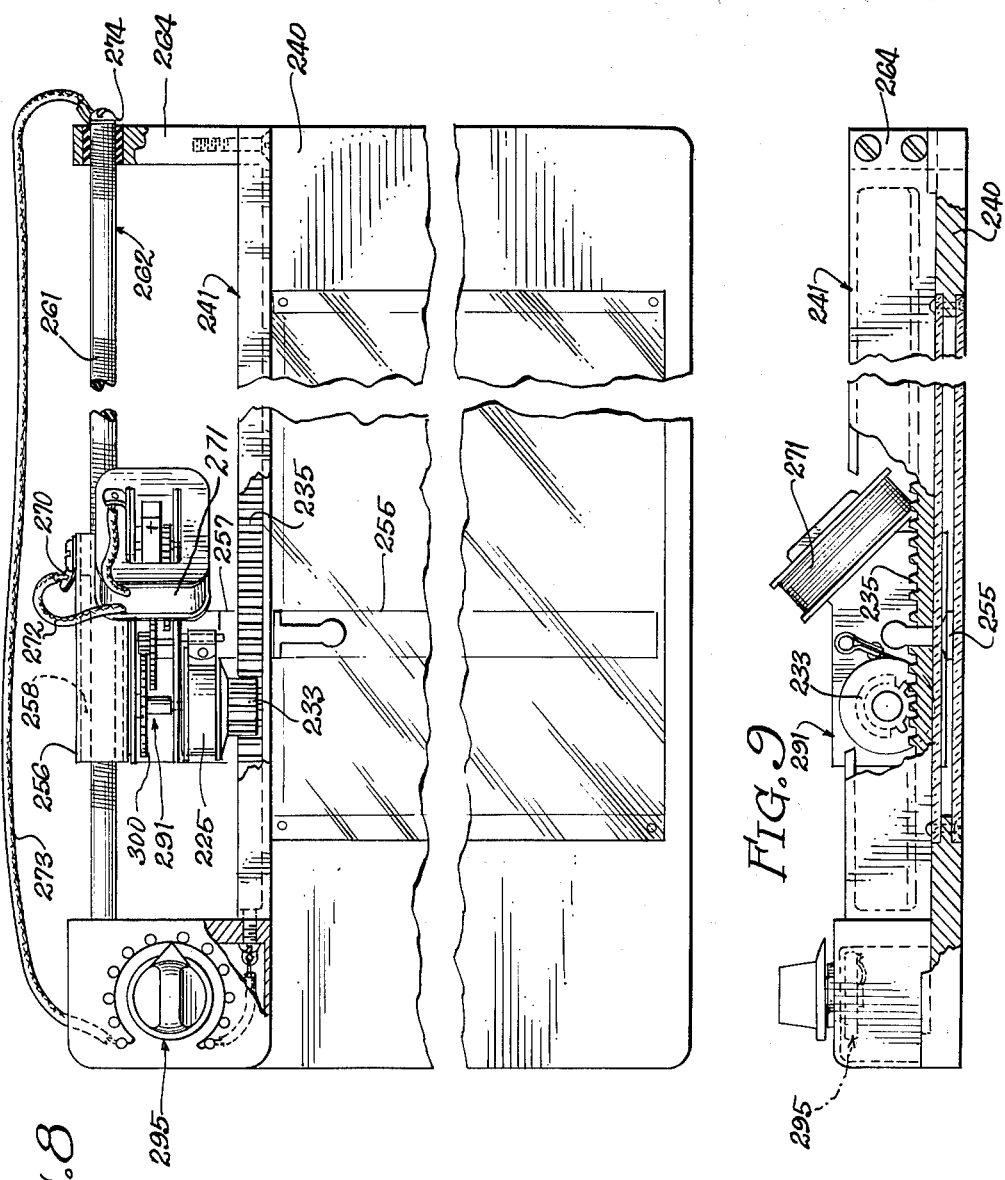

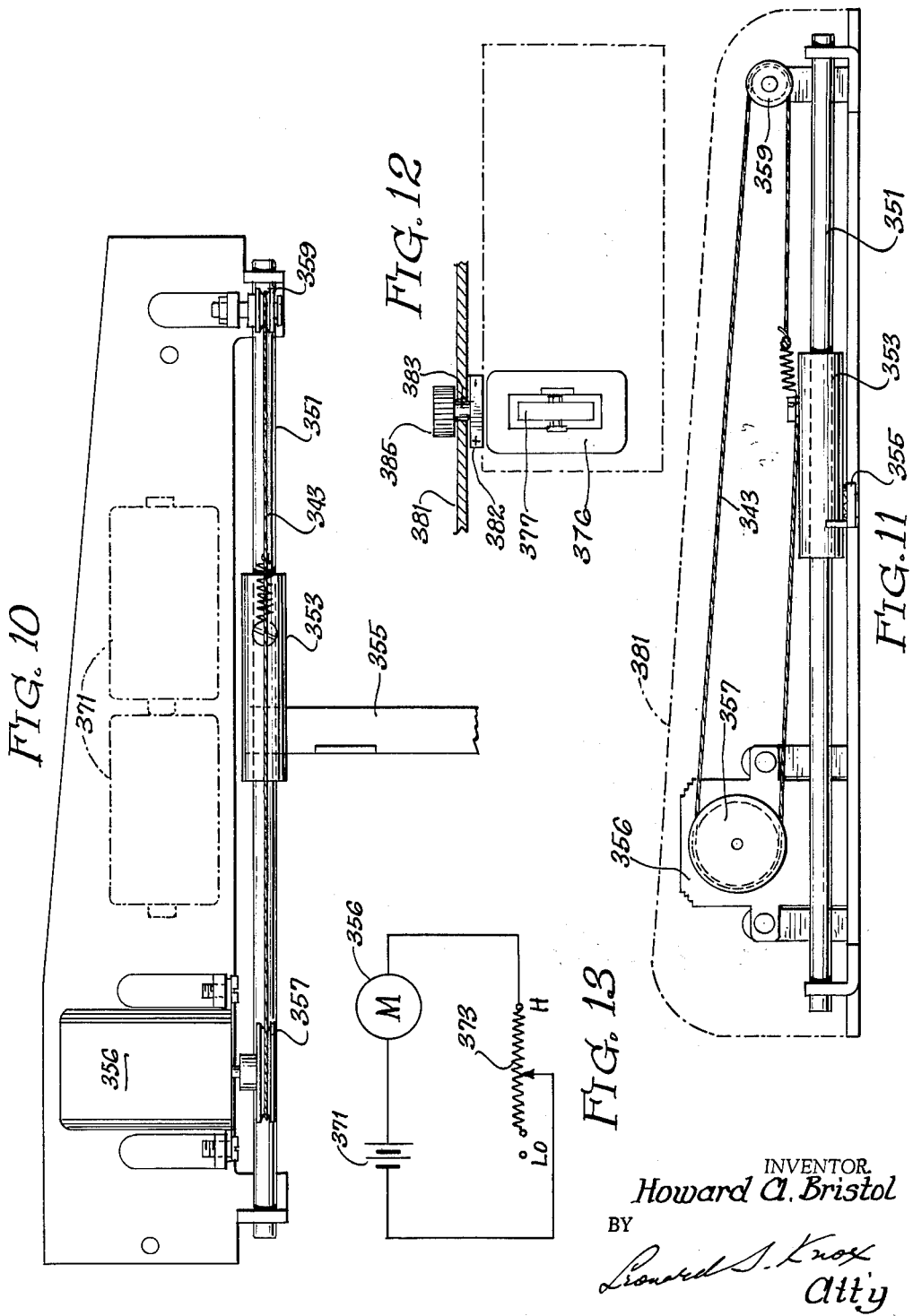

United States Patent Office 3,262,219
Patented July 26, 1966

3,262,219
READING TRAINING APPARATUS
Howard A. Bristol, Dolton, Ill., assignor to Supreme
Products Corporation, Chicago, Ill.
Filed Nov. 29, 1963, Ser. No. 326,914
15 Claims. (Cl. 35—35)

This invention relates to apparatus for use in rating, and for aiding in the development of, a person's reading ability, sometimes termed, for conciseness, reading training apparatus.

In its accepted or popular form, apparatus of this character comprises a driving mechanism adapted to traverse a scanner over a printed page at some selected constant rate, together with means for varying such rate in accordance with the state of development of the reader. That is to say, a slow adult reader may be expected to read in acceptable fashion at say, 250 words per minute while a skilled such reader would be classed at say, 600 words per minute. Thus, assuming a fixed width of printed line on the page, same fixed spacing of the lines and an average number of words per line, the apparatus would be operated at some speed which would cause a scanner forming part thereof to move down the printed page at a speed in inches per minute calculated to expose the words at some average count with which the person's ability could be correlated.

It is essential that the apparatus be constituted not only so that the scanner speed be accurately selectible within the available range, but also that such speed, when established, be maintained constant. However, prior apparatus known to me have been deficient in fulfilling these desiderata. For example, apparatus having an electric motor designed to operate from dry cells, which is one commonly used source of power, will have a changeable output as the cells become exhausted and there is provided no means to compensate for the resultant variation in speed. Thus, a speed set on the dial, of say 300 words per minute based on cells at full charge, may drop to as low as 100 words per minute as the output of the cells declines. Attempts have been made to use a constant speed A.C. motor together with braking (i.e., speed regulating means) operating on pneumatic principles. Wear of the parts and variable friction will introduce intolerable errors.

Accordingly, the present invention has for its principal object the elimination of these and other shortcomings of prior apparatus, by dispensing with dry cells or ordinary line voltage as a source of power and, instead, to utilize a spring motor including a coil spring of a unique type having substantially constant output, together with means for regulating the driving rate in the form of an electric generator connected to a controllable load.

Another object is to provide, as a source of power to drive the scanner, a coil spring of constant force, together with electromagnetic means cooperating therewith to regulate the rate at which the force is utilized, i.e., the scanning speed.

Another object is to provide apparatus as aforesaid utilizing a constant force driving spring together with mechanism to rewind the spring automatically as the scanner is manually returned to the top of the printed page.

Still another object is to provide reading training apparatus utilizing dry cells, together with an electric motor drawing an extremely small current but which is incapable of self-starting, thereby avoiding the comparatively heavy current drain on the dry cells, but which is provided with means accessible on the exterior of the casing enclosing the working parts to allow manual starting.

Other objects and advantages will become apparent from the following description which, taken with the accompanying drawings, discloses certain forms in which the principles of the invention may be embodied in practice.

In these drawings:

FIG. 1 is a top plan view of a preferred form of apparatus embodying the principles of the invention;

FIG. 2 is a partial view of the apparatus shown in FIG. 1, with the cover removed, and turned 90°;

FIG. 3 is a side elevation of that portion shown in FIG. 2;

FIG. 4 shows details of the mechanism, part of which is schematic;

FIG. 5 is a top plan view of an alternative form of apparatus;

FIG. 6 shows a portion of the apparatus of FIG. 5, with the cover removed;

FIG. 7 is a cross-section taken on the line 7—7 of FIG. 6;

FIG. 8 illustrates, in top plan, still another modification;

FIG. 9 is a combined side elevation and cross-section of that form of apparatus shown in FIG. 8;

FIG. 10 is a partial top plan view of another embodiment;

FIG. 11 is a side elevation of that embodiment shown in FIG. 10;

FIG. 12 is a detail of the motor-starting arrangement used in connection with FIGS. 10 and 11; and FIG. 13 is a circuit diagram to be read in connection with FIG. 10.

Broadly regarded, the invention, in one aspect comprehends a reading training apparatus comprising a supporting base which may be part of a frame, carrying driving means arranged to traverse a scanning bar down the length of a printed page at some selected rate. The source of power is a spring of the constant force type arranged to drive a sheave over which a flexible belt-like element is looped, the opposite end whereof passes over an idler. The scanning bar extends from a shoe slidable on a support rod and the shoe is secured to the flexible element to be moved translationally thereby. Thus, the output of the spring is evidenced as movement of the scanning bar. To regulate the rate at which the bar is traversed over the printed page the spring is arranged to drive the rotor of an electrical generator, the field of which is connected to a load in the form of an adjustable resistance. Thus, by varying the amount of resistance in circuit, as by a knob under the control of the operator, the load on the generator field and hence the retarding force on the rotor, is varied. Such force is fed-back to the spring motor to regulate its driving rate. Inasmuch as it is desirable to rotate the rotor at some speed in excess of the rate of the spring in order to generate a usable voltage, gearing of a step-up ratio is introduced. The constant force spring motor is desirably of a commercial type consisting of a specially pre-stressed band adapted to be wound and unwound between a pair of spools although such springs are available in other types. After the scanner has reached the bottom of the page the operator rewinds the spring by manually returning the scanner to the top of the page, the flexible element reversing the sheave which normally transmits motive power thereto. If no provision is made, the sheave will tend to back-drive the step-up gearing between the spring and the generator. Inasmuch as such gearing is of relatively high ratio the rewinding force would therefore be substantial. Accordingly, a uni-directional clutch is interposed between the spring motor and sheave to disengage the gearing when the motor is re-wound. In a preferred form, the supporting base for the mechanism is part of a frame defining an open space adapted to expose the printed page. Additionally, such space may be spanned by a transparent plastic window above which the scanner moves. One side of the frame may be rabbeted to act as a guide for the distal end of the scanner bar whereby this latter may not engage frictionally with the window in a sporadic manner to render the selected scanning rate non-uniform.

In another aspect, the spring motor is of the conventional spiral-wound type and is arranged to drive the scanner through a sheave and flexible element arranged as pointed out in the preceding paragraph, or through a pinion driving a rack. In this case, the scanner is secured to the rack. Since the output of the spring varies from a maximum, when fully wound, to a minimum when fully unwound regulating means are provided to maintain the scanner speed constant. Thus, the spring motor is arranged to drive the contact arm of a rheostat, the resistance element of which is in series connection with the field of a generator as explained heretofore. Thus, the generator output is applied across a resistance which is varied at a rate proportional to the movement of the scanner. Included in such series circuit is another resistance which is of constant value for any predetermined scanning rate but which may be set at such value by the operator. The rotor of the generator is driven by the spring motor through step-up gearing in the same manner as previously described.

In still another aspect, the arrangement is similar to the immediately preceding embodiment except that the spring motor, step-up gearing and generator are mounted on a carriage to which the scanner is secured. A pinion driven by the spring motor is in mesh with a fixed rack so that rotation of the pinion drives the carriage—and therefore the scanner—along the length of the printed page. There is also provided a fixed rod of electrically-resistive material or an insulating rod supporting a resistance wire. A contact shoe bearing on the rod or wire is arranged to move with the carriage to vary the resistance in circuit as the carriage moves to traverse the scanner. Such fixed resistance element is connected in series with the speed-selecting rheostat and generator field to provide the same results as mentioned in the preceding paragraph.

In another aspect there is provided apparatus for the purpose stated in which the motive power for the scanner is derived from a constant speed D.C. motor energized by dry cells but characterized in that the same is not self-starting whereby increased current drain on starting is avoided, and cell life enhanced. Inasmuch as the working parts of the apparatus, in commercial versions thereof, are enclosed, the invention comprehends simple and effective means for starting the motor manually. Such means comprises a rotatably mounted, permanent magnet closely adjacent the permanent magnet constituting the armature of the motor together with a knob whereby the rotatable magnet may be spun digitally to create a movable field which in turn disturbs the "dead-center" stopped condition of the armature sufficiently to start the motor.

Adverting to FIGS. 1 to 4, there is illustrated, by way of example, a reading training apparatus comprising a base plate 10 which may be a portion of a frame 12. In this latter case, the various elements constituting the driving mechanism are desirably located on the left side of the frame and the line scanner arranged to traverse a space or window 13 defined by the frame. Such window is preferably spanned by a sheet of transparent plastic to avoid contact of the scanner with the printed page whereby friction, viz braking force would otherwise be introduced, and to avoid damage to the printed matter by rubbing. It will be understood that the printed page is presented within the margin of the window and may be a page of a book. In this case the frame will be provided with legs of such character as to support the apparatus above the book in a steady position. Inasmuch as frames for the foregoing purposes are well known in this art and the frame disclosed herein is only incidental to the main objectives, further elaboration is deemed non-essential.

A framework 15 comprising a pair of parallel plates 16 and 17 spaced apart and supported by any common means (not shown) is secured to the base plate 10 by screws 21. Desirably, the plates 16 and 17, or at least that portion of the framework 15 supporting the generator field winding to be described, are of non-magnetic material.

A stub shaft 23 is secured to the plate 17 and carries a rotatable drum 24 upon which one end of a constant torque motor spring 25 is adapted to wind and unwind. Such springs are available from, and their characteristics are described in Bulletin 310R, January 1962, published by Hunter Spring Division of Ametek, Inc., Lansdale, Pennsylvania. Particular reference is made to the Type B motor illustrated in FIG. 4, page 3. Briefly, a spring of this type comprises a specially processed metal band having a built-in spiral form on one drum which is reversely bent around a larger drum. This second drum holds the material only so long as its rotation is restrained. When released, the tendency of the material to re-curl to its present curvature causes it to re-wind onto the smaller drum, imparting torque to the larger drum.

The aforementioned second drum 31, in the form of an annular shell, is adapted to dispense or receive the other end of the spring 25. For a reason which will appear, the drum 31 is one member of a unidirectional clutch, the other members of which are a coil spring 32 and a hub 34, this latter being affixed to a shaft 36 journalled in the framework 15. A clutch as thus constituted is well-known and is so arranged that the spring 25, in restoring its wound condition on the drum 24, can drive the shaft 36 in one predetermined direction, in this case counter-clockwise, but to disengage from the shaft 36 when the direction of feed of the spring 25 is reversed, as upon re-winding the same on the hub 31. This is accomplished by fixing the ends of the coil spring 32 to the driving and driven members respectively, and in relation to the direction of its coils (clockwise or counterclockwise) so that when rotation is in the driving sense, the coil spring grips the hub 34 but when in the opposite sense, slippage occurs.

The hub 31 has an extension 41 which is grooved at 42 to accommodate a flexible looped elements 43, e.g., a cord or ball chain, this latter being received over an idler sheave 46 supported for rotation on a bracket 47 secured to the base plate 10.

A guide rod 51 is secured at one end in a standard 48 and at the opposite end in the bracket 47. A shoe 53 is adapted to slide upon this rod and has the scanner bar 55 secured thereto and extending therefrom across the printed page to be scanned. FIGS. 2 and 3 show two positions of the shoe 53 in full lines and another position in broken lines. The shoe 53 is attached to the looped element 43 by any suitable expedient, e.g., lugs 56 held by a screw 57, these lugs having slots with which the ends of the element 43 are engaged and in a well-known fashion.

In the case where the mechanism is carried on a frame, as in FIG. 1, the distal end of the scanner bar 55 may be arranged to rest upon a rabbet 61 whereby the same is given support at such end and drag on the scanner, which might otherwise occur, precluded.

From the description thus far it will have become evident that, assuming the scanning bar 55 has traversed the entire page, it will be in the broken line position of FIG. 2. To reset the bar to the beginning line of the printed matter the operator will grasp the bar and shift it to the top of the page, as indicated by the full line position of FIG. 2. In so doing, the flexible element 43 is caused to drive the drum 31 to transfer the length of the spring 25 from the drum 24 upon which it had been wound previously as a result of the prior scan, and on to the hub 31. During such transfer the clutch including the coil spring 32, is disengaged, as heretofore pointed out. Upon the operator releasing the scanning bar, the spring 25, due to its inherent tendency to resume its unstressed position, will begin to re-wind itself on the drum 24, thereby driving the hub 31 in a counterclockwise direction. Thus, the flexible element 43 will propel the shoe 53 and its associated scanning bar 55 down the printed page at some rate which is predetermined by adjustable retarding means to be described. In this connection it will be understood that the characteristic of the motor spring will be selected to provide a maximum rate of scan and that such rate is reduced by the adjustable retarding means. The means for establishing such rate of retardation and for regulating the same at an essentially constant value will now be detailed.

Supported in any suitable manner, e.g., on one end of the framework 15 is a fixed winding or stator 71 comprising successive turns of insulated wire on a bobbin 72. The interior of the bobbin may be rectangular to be received with a tight fit over extensions 75—75 of the plates 16 and 17, or the bobbin may be otherwise supported fixedly. A rotor 81, preferably a bar-type permanent magnet, is carried on an axle 82 rotatable in the framework 15, and there is provided a pinion 85 also secured thereto. The shaft 36 has a gear 87. A train of gears and pinions indicated generally at 91 interconnects the gear 87 to the pinion 85 to translate the relatively slow rate of rotation of the drum 34, i.e. shaft 36, into a substantially higher rate of rotation of the rotor 81. It will be understood that, in order to generate a usable voltage, the rotor is revolved at a rate which is relatively high compared to the rate of rotation of the hub 31.

It will be apparent that the rotor 81 and winding 71 constitute a generator, and that the output of the generator may be fed to a suitable load. This load, in turn, represents a retarding force on the rotor. Hence, by varying the load connected to the generator output, the speed of the armature may be varied correspondingly. It will also have become clear that the spring 25 will, during rewinding, drive the rotor 81 and that any load on the latter represents a retarding force determining the rate at which the spring 25 may re-wind.

In order to provide a conveniently variable load on the generator, the same is connected by leads 94—94 to the wiper and resistance respectively, of a rheostat 95. The knob to operate the wiper is shown at 96 and has an index cooperative with a plurality of graduations. Once a prototype is calibrated, these graduations may be identified with respect to the scanning rate, i.e. so many words per minute, such as 200, 300, etc.

Thus, it will be clear that the rate at which the scanner bar traverses the printed lines may be established by appropriate adjustment of the rheostat and that such rate will be maintained at a constant value.

In practice, the working parts of the apparatus, except for the scanning bar, are concealed by suitable housings, as indicated at 100 and 101 in FIG. 1, these being fastened to the base plate 10 by any common means.

In an alternative embodiment, driving force is derived from a conventional helically-wound clock spring, and establishment and regulation of the scanning rate is accomplished by different means now to be detailed.

Thus, turning to FIGS. 5 to 7, a fixed base plate 110 carries a framework 115. A shaft 136 journalled therein is secured to a spring drum 131 to which the inner end (not shown) of a conventional, spirally-wound, clock spring 125 is attached, the opposite end thereof being looped and attached to a fixed post 132. A pinion 133 is integral with the drum 131 and is in mesh with a rack 135 slidable in guides, one of which, 137, is shown. In order that the rack may be self-supporting notwithstanding the guides 137, the same is preferably formed in one flange of a channel-shaped member 141; this expedient also serving to simplify the nature of the guides.

The scanner bar 155 is secured to one end of the rack member 141 to function in the same manner as previously described. That is to say, the mechanism shown in FIGS. 5 to 7 may be carried on one side of a frame, similarly to the showing of FIG. 1, in which case the distal end of the scanner bar may be guided thereupon.

As described thus far, it will be clear that the spring 125 is wound by traversing the scanner 155 from the bottom of the printed page P to the top thereof and, upon release thereof, the spring will drive the scanner in the reverse direction. However, for the reasons heretofore set forth, the rate of travel of the bar is, in accordance with the invention, capable of being established at some rate for the reading test then being conducted, and also regulated constant at such rate.

To this end, the spring 125 is adapted, through its shaft 136 and a gear train to drive the rotor 181 of a generator including the field winding 171, the arrangement of the parts being similar to those described in connection with FIGS. 2 and 4.

However, in the instant embodiment, the winding 171 is connected in series with a rate-establishing rheostat 195—mounted in some convenient fashion, e.g. on the cover 201 concealing the parts carried on the base 110—and with a rate-regulating rheostat 202 mounted in any convenient mode, e.g. on a standard 204. The wiper 205 of the rheostat 202 is driven from the rack 135 through the medium of a pinion 211, shaft 212, a pair of spiral gears 214 and 215 and shaft 216, although any equivalent transmission may be employed as long as the speed of the rack is translated into rotation of the wiper 205.

Having in mind the operation of that embodiment comprehended by FIGS. 1 to 4, it will now be understood that the load on the generator, i.e. current caused to flow in the winding 171 is adjusted, by means of the rheostat 195, to some value which will be evidenced through the gear train 191 as a retarding force on the spring 125, and will influence the rate of travel of the scanner bar 155. However, since in the present case, the spring rate is variable, depending upon the degree to which the same has been wound, means must be provided to render the same constant.

Accordingly, the rheotsat 202 is introduced in series with the rheostat 195 and winding 171, and its wiper is rotated in unison with movement of the rack 141. By providing a resistance in the rheostat 202 which is suitably proportioned to the variable rate of the spring 125, the load on the winding 171 is varied proportionately. That is to say, at the start of the unwinding of the spring 125 its force, if not controlled, is maximum and the rate of the scanner bar 155 therefore also a maximum and, at the point where the spring is substantially unwound, its force and the rate of the scanner, will be a minimum. Thus, the resistance of the rheostat 202 in relation to the position of its wiper 205 and the direction of rotation relative to the connected end of the resistance will be so proportioned that, when the spring starts to unwind the resistance in circuit is a maximum and is gradually cut out of circuit as the spring continues to unwind thereby to decrease the retarding force. By properly relating the rate of diminution of spring output to the varying resistance of the rheostat 202 the rate of the scanner may be maintained substantially uniform over its useful range. Such relationship may, insofar as concerns the rheostat 202, be accomplished in any well known manner, e.g. by use of a "tapered" resistance.

The embodiment of FIGS. 8 and 9 is similar in many respects to that of FIGS. 5 to 7. In the example, a rack 235 is formed on a channel-like support 241 secured to the framework 240 and a pinion 233 in mesh therewith corresponds to the pinion 133 of FIG. 6. The spring motor 225, transmission gearing 291 and generator are supported on a carriage 300 in order that, as the pinion 233 is driven the carriage will move from one end to the other of its range of movement. The scanner bar 255 is secured to the carriage. A shoe 256 carried on the carriage has a wiper or bushing 258 on the interior thereof which slidably engages a resistor 261, e.g. resistance wire wound on a dielectric rod 262 fixedly mounted on brackets, one of which, namely 264, is seen in FIG. 8. The wire may be laid in a groove in the rod 262 or cemented in place to insure that it will not be disturbed as the wiper 258 strokes across it. Obviously the wire need be present only over the maximum range of the wiper. The wiper is suitably insulated and is connected, via a terminal lug 270 and lead 272 to one side of the generator winding 271. The other side of this winding is grounded and the other ground connection, viz, is one side of the speed-establishing rheostat of the type heretofore described. The other side of the latter is connected via a conductor 273 to one end 274 of the resistor 261. Thus the general arrangement parallels that of FIGS. 6 and 7 except that the resistor 261 is substituted for the resistance of the rheostat 202. One important advantage of this alternative embodiment is the elimination of the gearing driving the rheostat. It will be understood that the turns of the resistor 261 will be so spaced as to achieve the desired compensation, viz, retarding action which is, in turn, proportional to the varying spring rate. Stated otherwise, in the region where the scanner begins its movement, the turns of the resistor 261 will be spaced closely, i.e. for maximum generator load and at the opposite end the turns will be farther apart, i.e. minimum generator load. In brief, the spacing of the turns will be spaced apart, measured from top to bottom of the scanning stroke, on a gradually increasing pitch.

In FIGS. 8 and 9 the generator winding and its spool are inclined. This is done merely because of the geometry of the surrounding parts as related to the conservation of space.

In FIGS. 10 to 13 there is illustrated a reading training apparatus in which the scanner bar 355 is driven at constant speed by an electric motor 356 provided with a sheave 357 over which and an idler sheave 359 a flexible element 343 is laid. This latter drives a shoe 353 slidable on a guide bar 351. Essentially these several elements and their function will be evident from the description of FIGS. 2 and 3. Dry cells 371 are connected in series with the motor 356 and a speed-establishing rheostat 373.

The motor 356 is designed to operate at a constant speed within some range of supply voltage capable of being supplied by inexpensive dry cells or through the medium of an equivalent dry-type rectifier connected to an A.C. supply. Input to the motor is varied in accordance with the desired scanning speed by means of the rheostat. It has been found that a low-cost, appropriate motor satisfying the driving requirements is available. However, the same utilizes an armature which is a permanent magnet and is not self-starting, for example, comprising a field winding 376 and bar armature 377 (FIG. 12).

Inasmuch as a commercial embodiment of the apparatus in accordance with FIGS. 10 to 13 will be provided with a casing 381 to conceal all of the working parts except for the scanner bar and the knob of the rheostat some externally accessible means must be provided for starting the motor.

To this end (FIG. 12) a permanent magnet 382, preferably of bar form, is affixed to one end of a shaft 383 rotatably mounted in a wall of the casing 381, the other end of the shaft bearing an exposed knob 385. The magnet 382 is positioned in the closest possible proximity to the armature 377. Accordingly, assuming the usual "on-off" line switch (not shown) is "on," to start the motor 356 the knob 385 is twirled by the fingers. The fluctuating magnetic field so created by such movement of the magnet 382 will affect the armature 377 in sufficient degree to throw the same off its "dead center" position. Once so agitated, the armature will shift into running relation with the field winding and will continue to rotate until interrupted by the line switch, or by stalling the same by arrest of the scanner. It will be understood that return of the scanner 355 to the initial position will simply cause slippage between the element 343 and sheave 357 provided, of course, that the element is not tensioned to the point where the sheave 357 is driven. In such case the motor may stall and have to be re-started. Although FIG. 12 shows the magnet 382 symmetrically arranged with respect to the armature 377 it will be understood that any minor displacement of the axis of the armature 377 relative to the axis of the magnet 382 will be sufficient to provide an eccentric disposition of the linking respective flux fields and that, moreover, the magnetization of the armature and bar magnet will not, as a practical matter, be perfectly symmetrical. In any case there is sufficient asymmetry to agitate the armature into rotation for at least 90° of rotation, whereupon the brushes and commutator begin their role. If desired the axis of the magnet 382 may be shifted to the left or right to unbalance the linked fields to a greater degree.

From the foregoing description it will have become apparent that the several forms of invention disclosed herein are simple and therefore inexpensive to manufacture, are trouble-free and capable of use by a person having no technical accomplishments. Once the scanner rate has been established by the user through the rheostat knob and its associated index and dial, the person need only know that the scanner is to be placed under the first line of testing copy and that, when the scanner reaches the end of its travel, return of the scanner to the place of beginning will re-start the scan.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

I claim:

1. Reading training apparatus for the purpose described comprising a framework, rectilinear guiding means mounted on said framework, a scanner bar slidably carried on said means adapted to be traversed from the top of a piece of printed matter to the bottom thereof at a predetermined rate and means for driving said bar comprising a spring motor, means coupling the output side of said motor to said scanner bar to traverse the same, an electrical generator including a rotor and a field winding, an adjustable electrical load connected to said winding, transmission means coupling the output side of said motor to said rotor to drive the same, whereby the retarding torque on the rotor is fed back to the motor to control the unwinding rate thereof at some selected value in proportion to some adjusted value of the load to control the rate of delivery of driving force from the motor to the scanner bar.

2. The combination in accordance with claim 1 wherein the motor comprises a constant torque pre-stressed, resilient band and a pair of drums between which the spring may be wound and unwound, one of said drums being included in the means applying driving force to the scanner bar.

3. The combination in accordance with claim 1 wherein said adjustable load is a rheostat connected across said winding.

4. The combination in accordance with claim 2 wherein one drum is provided with a sheave, an idler sheave is mounted on said framework, and a flexible belt-like element passes over said sheaves, the scanner bar being connected to said element.

5. The combination in accordance with claim 1 wherein said transmission is constructed and arranged to drive the rotor at a speed substantially greater than the speed of the motor.

6. Reading training apparatus for the purpose described comprising a framework, an elongated guide mounted on said framework, a member to scan a printed page line-by-line in an uninterrupted movement, said member having a shoe slidably carried on said guide, a driving sheave, an idler sheave, a flexible belt-like element carried over said sheaves, said shoe being connected to said element, motor means to rotate said driving sheave comprising a storage drum, a driven drum and a pre-stressed, resilient band arranged to be wound from the storage drum to the driven drum, the band being so characterized that when unwound from the storage drum onto the driven drum the same is placed under a stress tending to rewind the band onto the storage drum, such restorative action providing a motive force to drive the sheave, and means to regulate the rate of rewinding comprising an electrical generator having a field winding and a rotor, a variable resistance connected to said winding and means connecting the motor means to the rotor to drive the same.

7. The combination in accordance with claim 6 further characterized in that a uni-directional clutch is interposed between the driving sheave and the driven drum whereby when the scanning member has reached the end of the page the same may be manually returned to the top of the page without back-driving the driving drum.

8. Reading training apparatus for the purpose described comprising a framework, an elongated rod supported on said framework, a shoe slidably mounted on said rod, a scanner bar carried on said shoe for movement therewith adapted to travel down the printed page at some selected rate, a constant-torque spring motor mounted on said framework to drive said shoe through its range of movement, said motor comprising a storage drum and a driven drum, each rotatably mounted on said framework, a pre-stressed spring band characterized to be normally wound on said storage drum in a substantially unstressed condition and to be forcibly unwound from said storage drum onto said driven drum and, by virtue of its inherent tendency to restore the unstressed condition, to wind itself onto said storage drum thereby to rotate the driven drum, means coupling said driven drum to said shoe, an electrical generator having a rotor and a field winding, a variable resistor connected across said winding constituting the load on said generator, transmission means coupling the driven drum to said rotor whereby by selecting a value of the variable resistor the angular velocity of said driving drum may be predetermined and translated into some selected linear velocity of the scanner.

9. The combination in accordance with claim 8 further characterized in that said first mentioned coupling means includes a uni-directional clutch whereby said scanner may be manually returned from the bottom of the page to the top to transfer the spring band from the storage drum to the driving drum without back-driving said second mentioned coupling means.

10. Reading training apparatus for the purpose described comprising a framework, a rack supported on said framework for translational movement relative thereto, an arbor rotatably supported on said framework, a spring motor mounted on said framework, said motor including a spirally-wound band having its outer end fixed and its inner end connected to said arbor, a pinion in mesh with said rack keyed to said arbor, a scanner bar carried by said rack to traverse the printed page as the rack is driven by the pinion, an electrical generator having a rotor and field winding, first transmission means coupling said arbor to said rotor to drive the same as the band unwinds, a first rheostat including a resistance element, a wiper cooperative therewith and manual means connected to the wiper to establish some selected value of the resistance element in circuit, a second rheostat including a resistance element and a wiper cooperative therewith, circuit means connecting said rheostats and field winding in series, second transmission means coupling the output side of the spring motor to the wiper of the second rheostat to vary the second resistance element synchronously with movement of the scanner, said transmission means being so constructed and arranged as to establish a maximum value of the second resistance when the band is substantially fully wound and a minimum value thereof when the band is substantially fully unwound with continuous variation of the second resistance between maximum and minimum to vary the value of the second resistance to vary the load on the winding correspondingly, the resulting retardation of rotor speed being reflected back as a retarding force on the scanner whereby the diminishing torque of the spring motor as it unwinds is compensated to maintain the scanning rate substantially at a predetermined value.

11. The combination in accordance with claim 10 wherein said second transmission means includes a second pinion in mesh with the rack.

12. The combination in accordance with claim 10 wherein said first transmission means includes means to rotate the rotor at an angular velocity substantially in excess of the arbor velocity.

13. Reading training apparatus for the purpose described comprising a framework, a rack secured to said framework, a carriage, means to support said carriage for translational movement relative to said framework, an arbor rotatably supported on said carriage, a spring motor mounted on said carriage, said motor including a spirally-wound band having its outer end fixed and its inner end connected to said arbor, a pinion in mesh with said rack keyed to said arbor, a scanner bar carried by said carriage to traverse the printed page as the carriage moves over its range of travel, an elongated resistance element supported on said framework with its axis parallel to the path of movement of said carriage, a wiper carried by said carriage slidable on said element, an electrical generator having a rotor and a field winding, transmission means coupling the arbor to the rotor to rotate the same, a rheostat including a wiper and resistance element, said wipers and one end of each resistance element and the field winding being connected in series to constitute the elements as variable portions of the load on the generator, means to manually adjust the effective value of the rheostat resistance to establish, together with the varying resistance of the elongated resistance element, a predetermined rate of travel of the scanner bar, the resistance of said elongated element in circuit being varied as the wiper thereon travels therealong, said elongated element resistance being so constructed and arranged that when the wiper is adjacent the connected end of the element the resistance thereof in circuit is a maximum and when at the remote end thereof the resistance thereof in circuit is a minimum, with variation in resistance being proportional to displacement of the wiper as the carriage moves, whereby the retarding force on the spring motor represented by the varying load on the generator is greatest at the beginning of the scanning stroke and least at the end thereof thereby to provide substantially constant speed of the scanner bar.

14. The combination in accordance with claim 13 further characterized in that the elongated resistance element is a plurality of turns wound on a dielectric support, the pitch of the turns being a minimum at substantially the beginning of wiper movement and a maximum at substantially the end of the wiper movement with the pitch gradually changing from said beginning to said end.

15. The combination in accordance with claim 14 further characterized in that there is provided a shoe slidable on said element and the wiper is affixed to the shoe, said shoe being secured to the carriage.

References Cited by the Examiner
UNITED STATES PATENTS

| | | | |
|---|---|---|---|
| 2,059,518 | 11/1936 | Harley | 310—156 |
| 2,078,805 | 4/1937 | Merrill | 310—156 |
| 2,662,306 | 12/1953 | McMaster | 35—35.2 |
| 2,919,500 | 1/1960 | Simpson et al. | 35—35.2 |

EUGENE R. CAPOZIO, *Primary Examiner.*

WILLIAM GRIEB, *Assistant Examiner.*